(12) United States Patent
Chou

(10) Patent No.: US 8,757,946 B1
(45) Date of Patent: Jun. 24, 2014

(54) CARGO RESTRAINT APPARATUS

(71) Applicant: Yeh-Chien Chou, Taoyuan County (TW)

(72) Inventor: Yeh-Chien Chou, Taoyuan County (TW)

(73) Assignee: Strong Yun Industrial Co., Ltd., Taoyuan County (TW)

( * ) Notice: Subject to any disclaimer, the term of this patent is extended or adjusted under 35 U.S.C. 154(b) by 0 days.

(21) Appl. No.: 14/013,072

(22) Filed: Aug. 29, 2013

(51) Int. Cl.
*B60P 7/08* (2006.01)

(52) U.S. Cl.
USPC .............. 410/104; 410/97; 410/118; 410/139

(58) Field of Classification Search
CPC ........ B60P 3/205; B60P 3/246; B60P 7/0815; B60P 7/0876; B60P 7/14; F16G 11/14
USPC ........... 410/97, 100, 104, 105, 106, 110, 117, 410/118, 130, 132, 139, 141; 24/115 K, 24/265 CD; 248/499; 87/2, 12
See application file for complete search history.

(56) References Cited

U.S. PATENT DOCUMENTS

2006/0078398 A1 * 4/2006 Frett .............................. 410/118

* cited by examiner

*Primary Examiner* — Stephen Gordon

(57) ABSTRACT

A cargo restraint apparatus for a cargo receptacle of truck is disclosed. The apparatus is composed of a track with engagement holes and a fastener. The fastener includes a seat with a sliding trough and a passage. Two guide plates are fixed on two sides of the seat. Each guide plate has an inclined guide tongue slidably received in the track. An insert is received in the sliding trough. A lever has a pivot hole at a center thereof for connecting to a pivot of the seat and a handle end and an action end are defined on two opposite sides of the lever. The action end is pivoted to the shaft. A torsion spring is disposed on the pivot and bears against the seat and the lever. The insert is normally engaged in one of the engagement holes.

6 Claims, 8 Drawing Sheets

CARGO RESTRAINT APPARATUS

BACKGROUND OF THE INVENTION

1. Technical Field

The invention relates to cargo restraint apparatuses used in cargo receptacles of trucks, particularly to tracked cargo restraint apparatuses.

2. Related Art

A typical cargo restraint apparatus includes a track fixed on a wall of a cargo receptacle and a fastener slidably mounted on the track. The fastener is provided with first and second spring-loaded trigger members. Only one of the two trigger members can be released from the track in a direction, and the other one of the two trigger members can be released from the track in another direction.

However, manufacturing costs of such a trigger member are expensive. Furthermore, a restraint apparatus requires two trigger members. This increases volume of the apparatus. When releasing the engagement holes, two trigger members need to be pressed and moved. Thus it is so difficult to operate the apparatus.

SUMMARY OF THE INVENTION

An object of the invention is to provide a cargo restraint apparatus, which has a simplified structure, reduced costs and easy operation.

To accomplish the above object, the apparatus of the invention is composed of a track with engagement holes and a fastener. The fastener includes a seat with a sliding trough and a passage. Two guide plates are fixed on two sides of the seat. Each guide plate has an inclined guide tongue slidably received in the track. An insert is received in the sliding trough. A lever has a pivot hole at a center thereof for connecting to a pivot of the seat and a handle end and an action end are defined on two opposite sides of the lever. The action end is pivoted to the shaft. A torsion spring is disposed on the pivot and bears against the seat and the lever. The insert is normally engaged in one of the engagement holes.

DETAILED DESCRIPTION OF THE INVENTION

Figure 1:
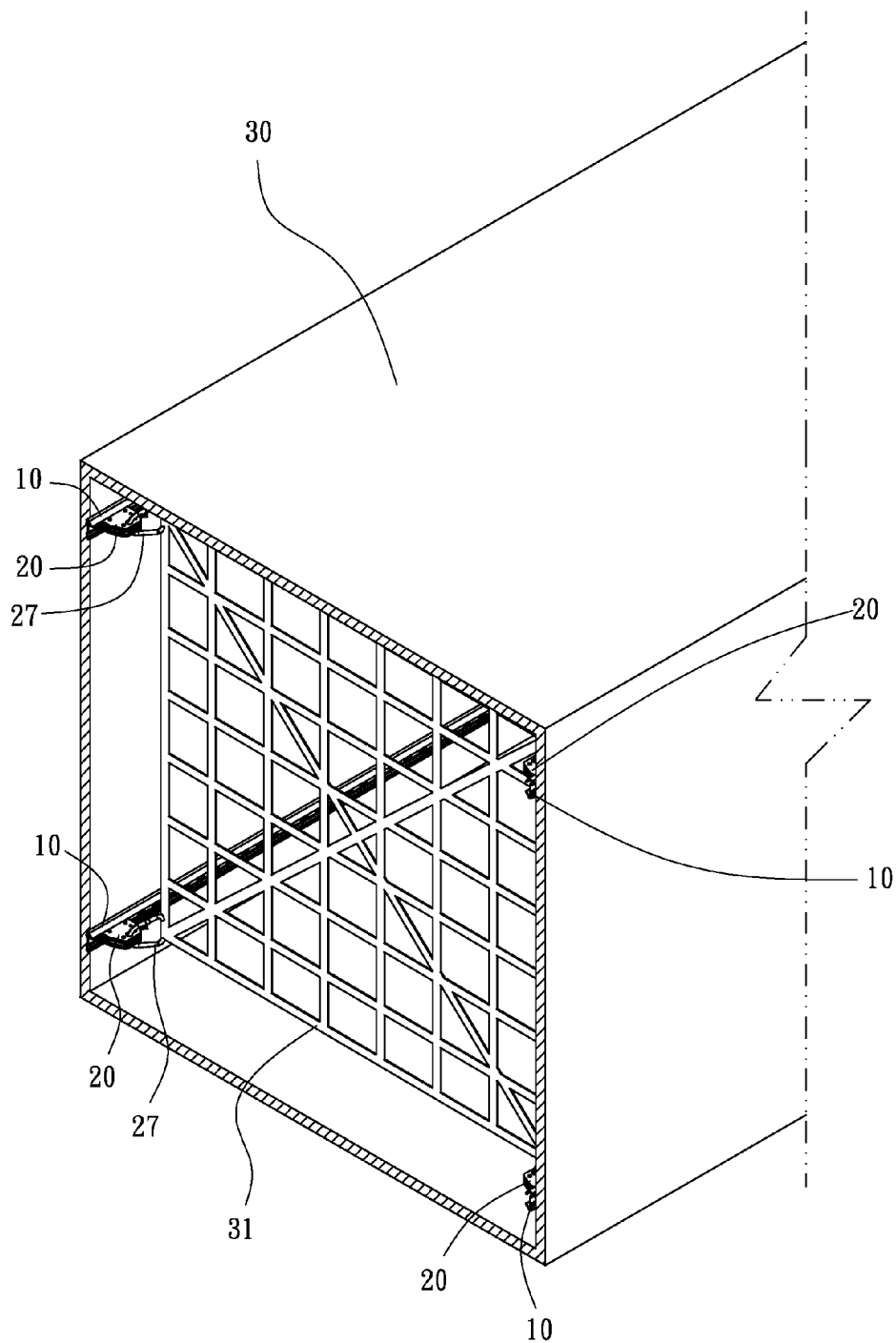
FIG. 1 is a schematic view of the invention used in a cargo receptacle.
Figure 2:
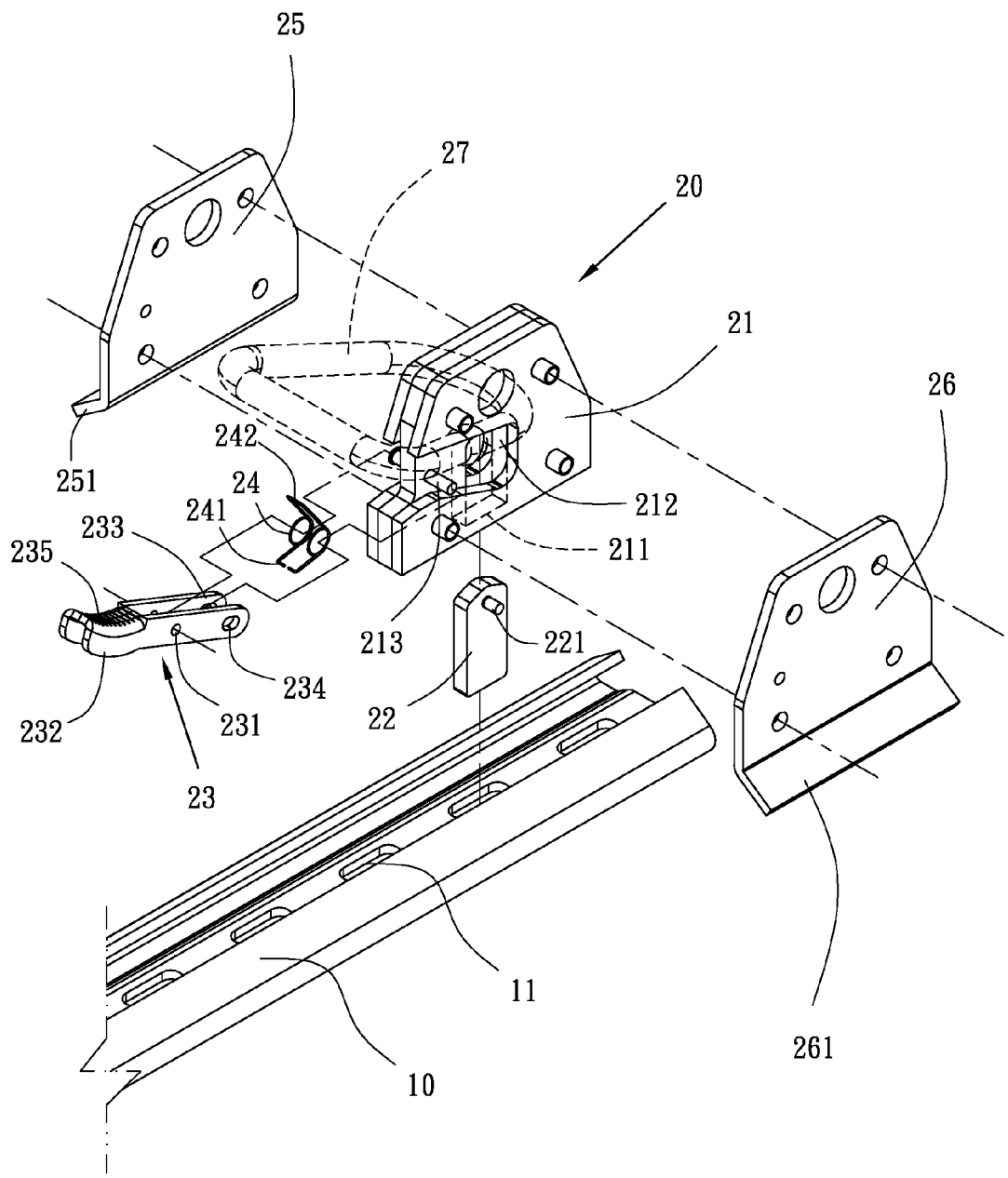
FIG. 2 is an exploded view of the invention.
Figure 3:
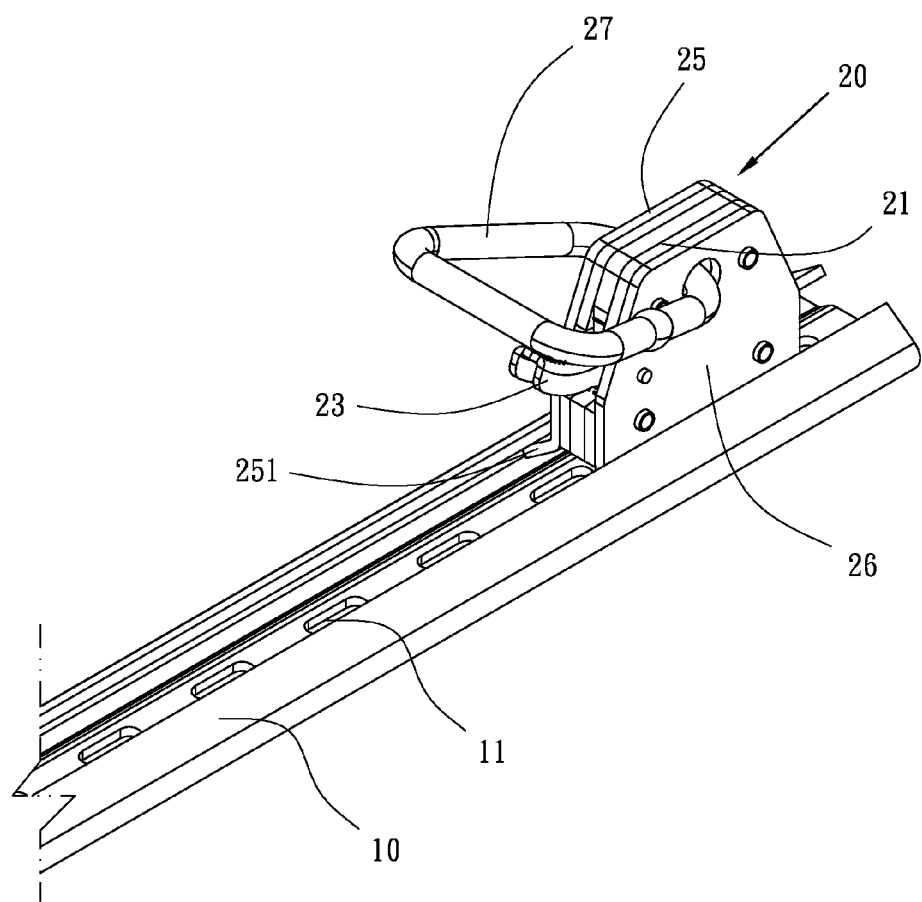
FIG. 3 is an assembled view of the invention.
Figure 4:
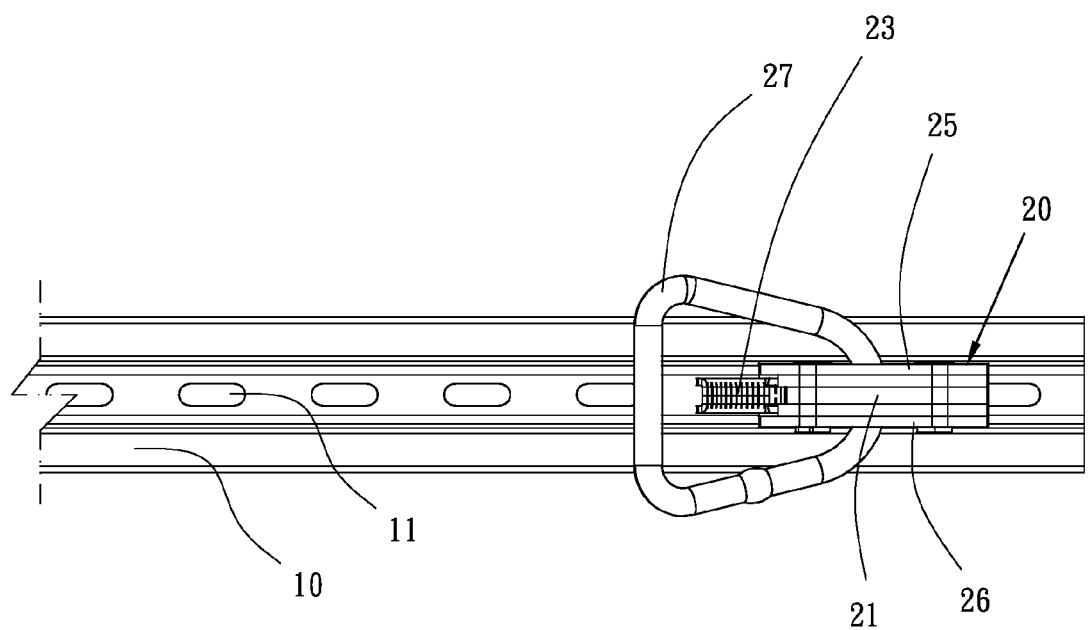
FIG. 4 is a top view of the invention.
Figure 5:
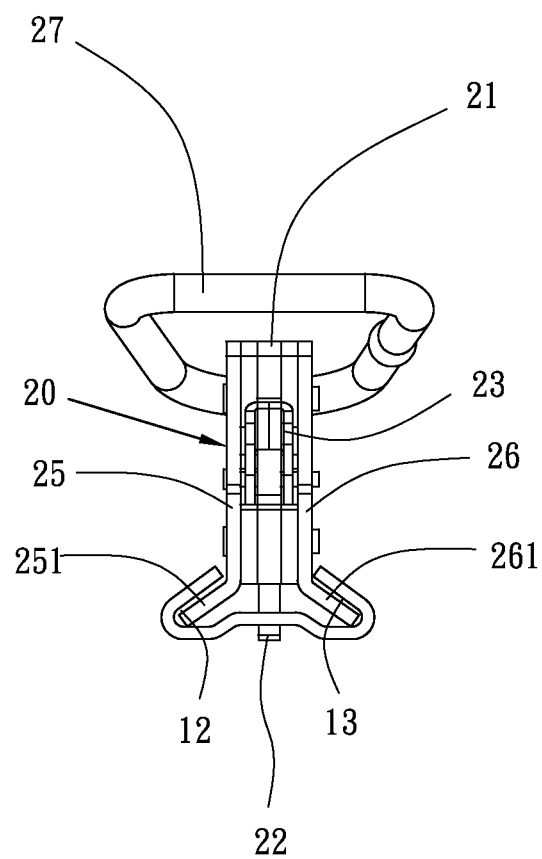
FIG. 5 is a front view of the invention.

Please refer to FIGS. 1-8. The cargo restraint apparatus of the invention includes a track 10 and a fastener 20.

The track 10 has a plurality of engagement holes 11 at intervals and two inclined guide troughs 12, 13. The fastener 20 includes a seat 21, two guide plates 25, 26, an insert 22, a lever 23 and a torsion spring 24.

The seat 21 is provided with a sliding trough 211 perpendicular to the track 10 and a passage 212 connected to an end of the sliding trough 211. The two guide plates 25, 26 are outward inclined and separately fixed on two sides of the seat 21. Each of the guide plates 25, 26 has an inclined guide tongue 251, 261 toward the track 10. The two guide tongues 251, 261 are separately slidably received in the guide troughs 12, 13 for securing the fastener 20 on the track 10.

The insert 22 is received in the sliding trough 211. A shaft 221 is formed on the insert 22 and located in the passage 212. The lever 23 is pivoted on the seat 21. In detail, the lever 23 has a pivot hole 231 at a center thereof for connecting to a pivot 213 of the seat 21. A handle end 232 and an action end 233 are separately defined on two opposite ends of the lever 23. The action end 233 is formed with an oval hole 234 pivoted to the shaft 221 of the insert 22. The handle end 232 of the lever 23 is provided with anti-slip striae 235.

The torsion spring 24 has a first end 241 against the seat 21 and a second end 242 against the handle end 232 of the lever 23. The torsion spring 24 is axially disposed on the pivot 213.

Figure 6:
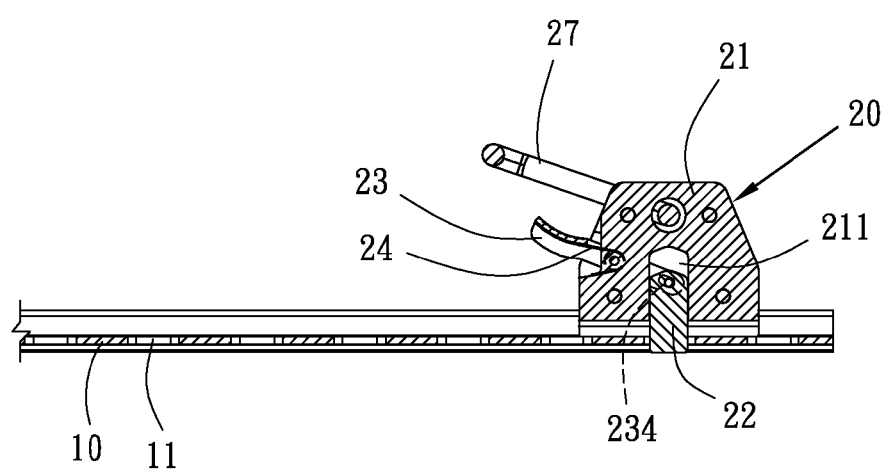
FIG. 6 is a longitudinal section view of the invention.
Figure 7:
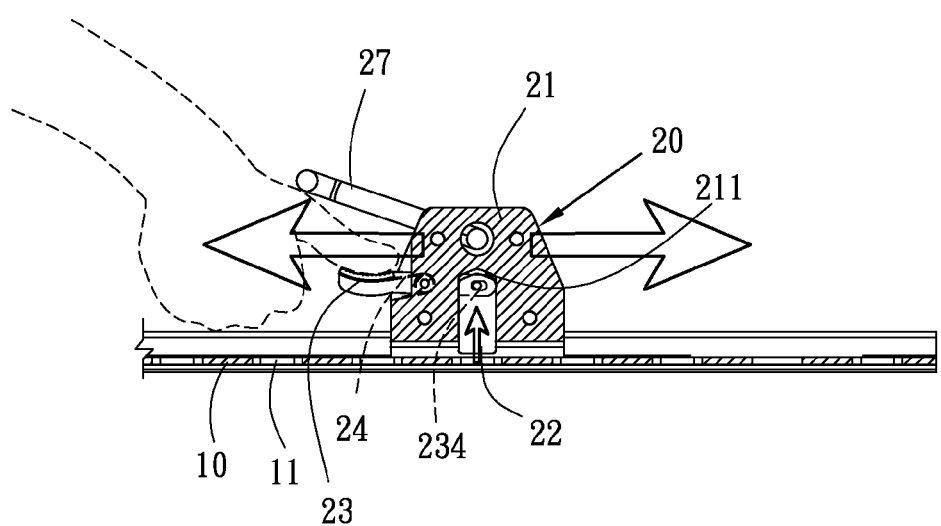
FIG. 7 is a schematic view of the invention in operation.
Figure 8:
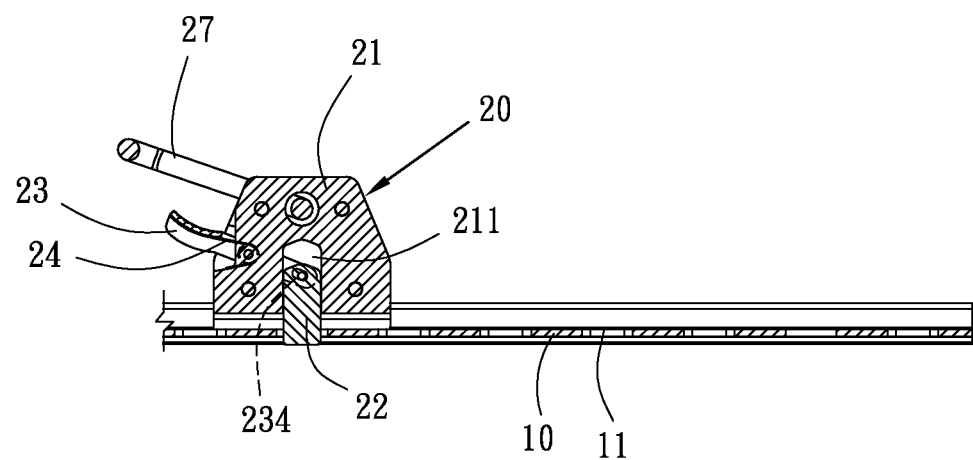
FIG. 8 is another longitudinal section view of the invention when the fastener has been moved.

As shown in FIG. 6, the insert 22 is normally engaged in one of the engagement holes 11 by pressure from the torsion spring 24. The insert 22 will be pulled up to escape from the engagement hole 11 when the handle end 232 of the lever 23 is pressed as shown in FIG. 7. At this time, the fastener 20 can be slid on the track 10 to another position. When the lever 23 is not pressed, the insert 22 will be engaged in another engagement hole 11 as shown in FIG. 8.

When the lever 23 is being pressed, the oval hole 234 will lead the shaft 221 of the insert 22 to move the insert 22 upward and downward without interference. The fastener 20 can be moved by only pressing the handle end 232 of the lever 23. It is very easy to operate.

Please refer to FIG. 1. Cargo in a cargo receptacle 30 can be restrained by a cargo mesh 31. Two walls of the cargo receptacle 30 are fixed with four tracks 10 and each track 10 is equipped with at least one fastener 20. Each fastener 20 has a hook 27 for securing a corner of the cargo mesh 31. Thus, the cargo mesh 31 can be tensed by four fasteners 20 and moved along the tracks 10 according to the actual requirement of the cargo.

It will be appreciated by persons skilled in the art that the above embodiments have been described by way of example only and not in any limitative sense, and that various alterations and modifications are possible without departure from the scope of the invention as defined by the appended claims.

What is claimed is:

1. A cargo restraint apparatus comprising:
   a track, having a plurality of engagement holes at intervals and two inclined guide troughs; and
   a fastener comprising:
      a seat, being provided with a sliding trough perpendicular to the track and a passage connected to an end of the sliding trough;
      two guide plates, separately fixed on two sides of the seat, and each having an inclined guide tongue toward the track, wherein the two guide tongues are separately slidably received in the guide troughs;
      an insert, received in the sliding trough, and having a shaft located in the passage;
      a lever, pivoted on the seat, wherein a handle end and an action end are separately defined on two opposite ends of the lever, and the action end is formed with an oval hole pivoted to the shaft; and
      a spring, having a first end against the seat and a second end against the handle end of the lever;
      wherein the insert is normally engaged in one of the engagement holes by pressure from the spring, and the insert is pulled up to escape from the engagement hole when the lever is moved.

2. The cargo restraint apparatus of claim 1, wherein the handle end of the lever is provided with anti-slip striae.

3. The cargo restraint apparatus of claim 1, wherein the two guide tongues are outward inclined.

4. The cargo restraint apparatus of claim 1, wherein the spring is axially disposed on a pivot.

5. The cargo restraint apparatus of claim 1, wherein the lever has a pivot hole at a center thereof for connecting to a pivot of the seat.

6. The cargo restraint apparatus of claim 1, wherein the spring is a torsion spring.

\* \* \* \* \*